March 15, 1932. F. W. HALL ET AL 1,849,924
WIRE ROPE TWIST EQUALIZER
Filed May 31, 1930
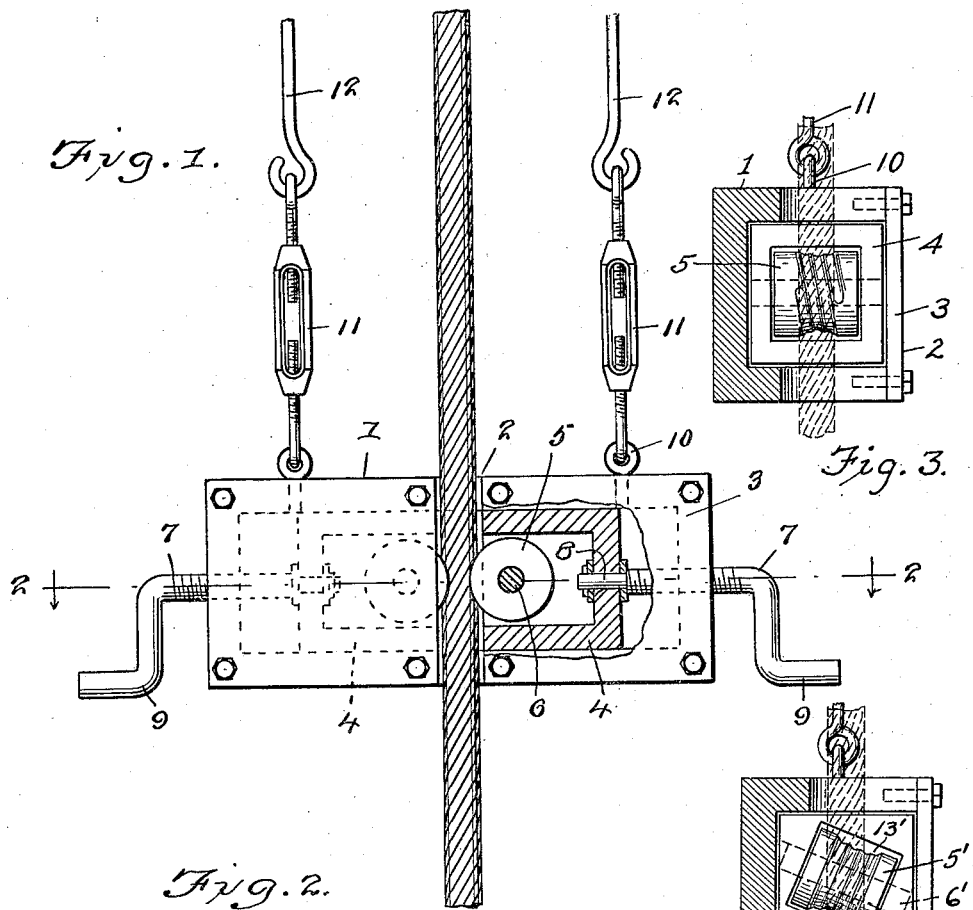
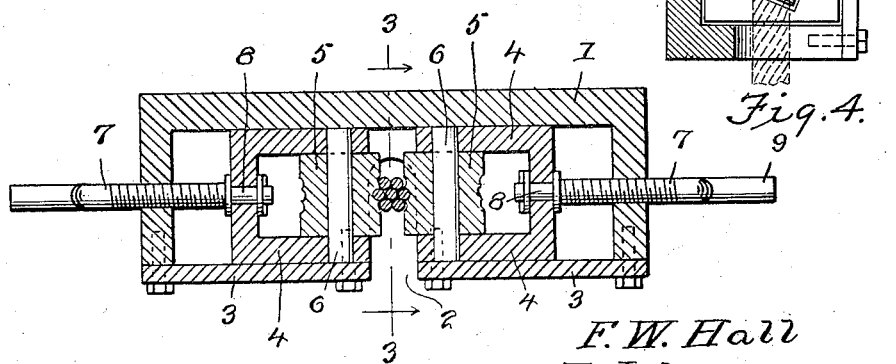
F. W. Hall
E. Johnson
AND W. R. Hall INVENTOR
BY Victor J. Evans
ATTORNEY Patented Mar. 15, 1932

1,849,924

UNITED STATES PATENT OFFICE

FRED W. HALL, EDWARD JOHNSON, AND WILLIAM RAY HALL, OF SAPULPA, OKLAHOMA

WIRE ROPE TWIST EQUALIZER

Application filed May 31, 1930. Serial No. 458,180.

This invention relates to a twist equalizer for wire rope, the general object of the invention being to provide a housing having a pair of roller carrying members slidably arranged therein, with manually operated means for causing the rollers to grip the rope, whereby the rope will be twisted as it is moved between the rollers.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a front view, partly in section, showing the device in use.

Figure 2 is a section on line 2—2 of Figure 1.

Figure 3 is a section on line 3—3 of Figure 2.

Figure 4 is a view similar to Figure 3, but showing a modification.

In these views, the numeral 1 indicates a housing having its front open and formed with a slot or notch 2 at the center of each of its top and bottom parts, these notches opening out through the front. Said front is closed by the cover plates 3 which are bolted or otherwise removably fastened to the housing, with their inner ends spaced apart to expose the slots.

A pair of casings 4 is slidably arranged in the housing with their adjacent ends open and each casing carries a grooved roller 5 rotatably arranged on a pin 6 which is carried by the casing and which is so located that a portion of the roller projects from the open end of the casing.

A threaded shaft 7 passes through a threaded hole in each end of the housing and each shaft is rotatably connected with the outer end of each casing, as shown at 8, the outer end of the shaft being bent to form a crank handle 9. Thus by turning the handles 9, the shafts will be moved longitudinally in the threaded holes in the ends of the housing so as to adjust the casings toward and away from each other. Eye bolts 10 are fastened to the top of the housing and turn buckles 11 connect these bolts with the links 12 which are fastened to the drilling clamps or to any other supporting means to hold the device stationary.

It will thus be seen that by placing the device on a rope, with the rope passing through the slots 2, and then turning the shafts 7, the rollers 5 will be caused to grip the rope so that the rope will be twisted as it passes through the device. The grooves in the rollers 5 are spirally arranged, as shown at 13 in Figure 3, but when the device is used with left laid wire rope, the rollers 5' have their axles 6' diagonally arranged, with the grooves 13' of annular formation instead of a spiral formation. The grooves in the rollers should be of the same width as the strands of the rope on which the device is being used and when the device shown in Figure 4 is used, the wheels should be placed at the same angle as that of the strands of rope. As the rope is drawn between the two wheels, it will turn around the same number of times the strands are twisted around the rope, which is approximately once to every six inches.

When the device is to be used, the rope is stopped with the tool a certain distance from the bottom of the well. The device is then put in place and the wheels clamped to the rope and then the rope is lowered until the tool strikes the bottom.

It is thought from the foregoing description that the advantages and novel features of the invention will be readily apparent.

It is to be understood that changes may be made in the construction and in the combination and arrangement of the several parts, provided that such changes fall within the scope of the appended claims.

What we claim is:—

1. A wire rope twist equalizer for well drilling apparatus, comprising a housing having an opening therein through which the rope passes, a pair of casings slidably arranged in the housing, one on each side of the opening, the adjacent ends of the casings being open, a grooved roller in each casing having a part projecting from the casing, the grooved portions of the rollers gripping the rope and a threaded shaft passing through a threaded hole in each end of the housing and having its inner end rotatably connected with a casing and its outer end having a handle thereon.

2. A wire rope twist equalizer for well drilling apparatus, comprising a housing having an opening therein through which the rope passes, a pair of casings slidably arranged in the housing, one on each side of the opening, the adjacent ends of the casings being open, a grooved roller in each casing having a part projecting from the casing, the grooved portions of the rollers gripping the rope, a threaded shaft passing through a threaded hole in each end of the housing and having its inner end rotatably connected with a casing and its outer end having a handle thereon and means whereby the housing can be lowered into the well.

In testimony whereof we affix our signatures.

FRED W. HALL.
EDWARD JOHNSON.
WILLIAM RAY HALL.